United States Patent
Okuno et al.

[11] Patent Number: 5,113,769
[45] Date of Patent: May 19, 1992

[54] CAR BODY FOR RAILWAY ROLLING STOCK AND METHOD FOR FABRICATING CAR BODY

[75] Inventors: Sumio Okuno; Michifumi Takeichi; Keiji Ohmura; Msato Okazaki; Hitoshi Tsuruda; Hiroyuki Yamada; Morishige Hattori; Kenji Kimura, all of Kudamatsu, Japan

[73] Assignee: Hitachi, Ltd., Tokyo, Japan

[21] Appl. No.: 362,048

[22] Filed: Jun. 6, 1989

[30] Foreign Application Priority Data

| Jan. 18, 1988 | [JP] | Japan | 1-7802 |
| Jun. 6, 1988 | [JP] | Japan | 63-137569 |
| Feb. 1, 1989 | [JP] | Japan | 1-20732 |

[51] Int. Cl.⁵ .............................. B61F 1/00
[52] U.S. Cl. .......................... 105/422; 105/397; 105/413; 105/419
[58] Field of Search ............... 105/396, 397, 404, 413, 105/414, 417, 418, 422, 419; 296/25, 182, 204

[56] References Cited

U.S. PATENT DOCUMENTS

| 2,786,556 | 3/1957 | Constance | 105/422 |
| 2,907,417 | 10/1959 | Doerr | 105/422 |
| 3,110,371 | 11/1963 | Ridder | 105/422 |
| 3,420,192 | 1/1969 | Ellis | 105/422 |
| 3,713,399 | 1/1973 | Bembridge et al. | 105/413 |
| 3,713,400 | 1/1973 | Teoli | 105/422 |
| 3,841,236 | 10/1974 | Hammonds et al. | 105/396 |
| 4,254,714 | 3/1981 | Heap | 105/422 |
| 4,951,992 | 8/1990 | Hockney | 105/422 |
| 4,966,082 | 10/1990 | Takeichi et al. | 296/204 |

FOREIGN PATENT DOCUMENTS

| 0551714 | 10/1956 | Belgium | 105/422 |
| 0241116 | 10/1987 | European Pat. Off. | 105/422 |
| 0151309 | 5/1950 | Japan . | |
| 8600588 | 1/1986 | World Int. Prop. O. | 296/204 |

Primary Examiner—Robert J. Oberleitner
Assistant Examiner—Mark T. Le
Attorney, Agent, or Firm—Antonelli, Terry, Stout & Kraus

[57] ABSTRACT

A car body for high speed railway rolling stock and a method of fabricating the same wherein, in order to prevent a variation of external pressures produced when the rolling stock travels at high speeds from being propagated into the interior of the car body, the car body is of an air-type construction. The car body has a reduced weight and is capable of withstanding a variation of the external pressures by the provision of a construction in which the underframe of the car body includes a curved surface having at least one radius of curvature extending across a width of the car body.

22 Claims, 4 Drawing Sheets

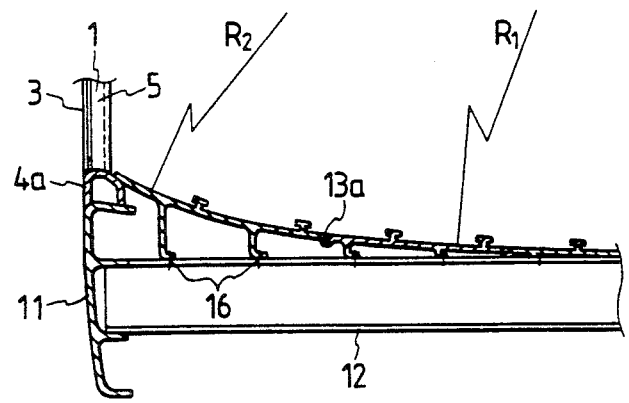
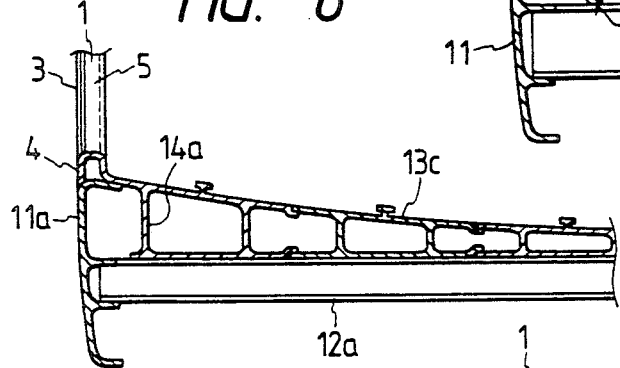
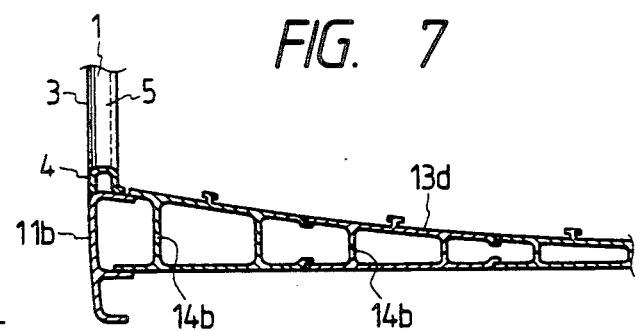
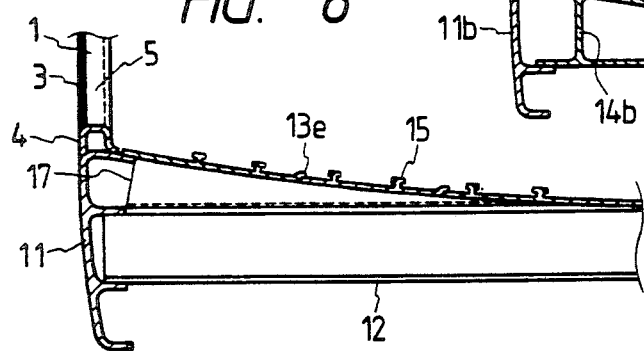
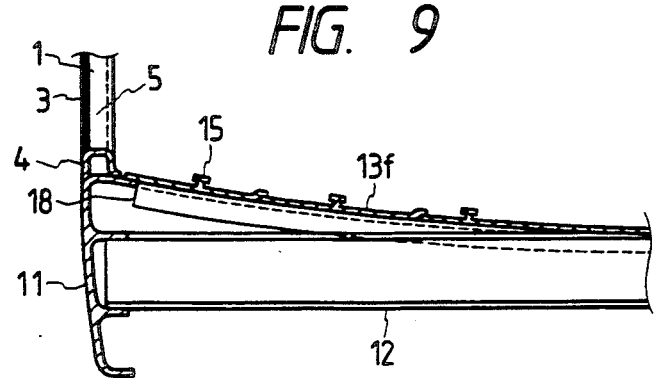

CAR BODY FOR RAILWAY ROLLING STOCK AND METHOD FOR FABRICATING CAR BODY

BACKGROUND OF THE INVENTION

The present invention relates to railway rolling stock and, more particularly, to a car body for railway rolling stock and a method of fabricating the car body, with the car body being capable of being utilized at high speed travel.

In order to reduce the travel time between destinations in order to increase the volume of transportation, there has been a recent tendency to increase the travel speed of railway rolling stock; however, with such increase in travel speeds, various problems have arisen regarding the construction and fabrication of car bodies for railway rolling stock.

More particularly, with the railway rolling stock traveling at high speeds entering, for example, a tunnel, the external or outside pressure of the vehicle varies, with the larger external pressure being experienced when two vehicles pass each other in the tunnel. Consequently, it is imperative that the car body of the railway rolling stock be airtight so as to prevent any variation of the external pressure from being propagated to the interior of the vehicle; therefore, any variation of external pressure directly acts on the exterior portion of the car body. Thus, it has become necessary to provide a car body construction which is capable of enduring the variation in the external pressure to which the car body is exposed by virtue of increased travel speed.

Another significant factor which must be taken into consideration when considering high speed travel of railway rolling stock are the tracks upon which the railway rolling stock operates since the construction of the car body greatly affects the service life and condition of the tracks. Thus, there has been a demand to reduce the overall weight of the car body while nevertheless providing a sufficiently rigid car body construction capable of enduring the variation of external pressure acting on the exterior thereof as well as other problems resulting from the high speed travel.

In, for example, Japanese Utility Model Registration Application laid open no. 151309/1976, a circular car body is proposed to meet the stringent requirements occasioned by high speed travel of the railway rolling stock. In the proposed arrangement, the car body has a circular curved surface in which both side walls and the roof there are continuous on a flat underframe. By virtue of this construction, when the pressure caused by a variation in external pressure acts on the external portions of the car body, the tension within the surface acts on the outer plates since both the side walls and the roof are of a circular curved configuration. Thus, a bending moment outside the surface acting on the outer plate of both the side walls and the roof can be reduced. However, since the underframe is of a flat construction, when the external pressures act on the exterior of the car body, a greater bending moment upon the underframe and it has been necessary to have the underframe firmly constructed in order to compensate for such bending moment. While it is possible to increase the strength of the underframe and various associated members forming the underframe, in taking such an approach, the weight of the car body increases which is clearly not preferable in constructing high speed rolling stock.

Additionally, with high speed railway rolling stock which is powered by a large capacity electric drive means, the electric drive means are, for the most part, mounted on a lower surface of the underframe and, in particular, under the floor of the car body. Consequently, it is necessary to strengthen the underframe a sufficient amount so as to enable a support of the electric drive means which also leads to an increase in the weight of the underframe and, consequently, the car body.

The aim underlying the present invention essentially resides in providing a car body for a railway rolling stock which is lightweight and which is capable of withstanding a variation of external pressures applied on the car body.

An object of the present invention resides in providing a car body for railway rolling stock which is simple in construction and which can be easily fabricated.

Yet another object of the present invention resides providing an underframe for a car body of a railway rolling stock which has a sufficient strength to support the necessary components thereof while having a relatively light weight.

A still further object of the present invention resides in providing an underframe for a railway rolling stock which is simple in construction and which is relatively easy to manufacture.

Yet another object of the present invention resides in providing a method of fabricating a car body for railway rolling stock which facilitates the assembly of the car body.

The above and other objects, features, and advantages of the present invention will become more apparent from the following description when taken in connection with the accompanying drawings which show, for the purposes of illustration only, several embodiments in accordance with the present invention.

BRIEF DESCRIPTION OF THE DRAWINGS

FIG. 5 is a transverse cross-sectional view of a lower portion of a car body detecting the side construction and underframe constructed in accordance with the present invention;

FIG. 6 is a transverse cross-sectional view of a lower portion of a side construction and underframe of another embodiment of a car body constructed in accordance with the present invention;

FIG. 7 is a transverse sectional view of a lower portion of a side construction and underframe of a car body constructed in accordance with a still further embodiment of the present invention;

FIG. 8 is a transverse cross-sectional view of a lower portion of a still further embodiment of a side construction and underframe of a car body constructed in accordance with the present invention.

FIG. 9 is a transverse cross-sectional view of a lower portion of yet another embodiment of a side construction and underframe of a car body constructed in accordance with the present invention.

DETAILED DESCRIPTION

Figure 1:
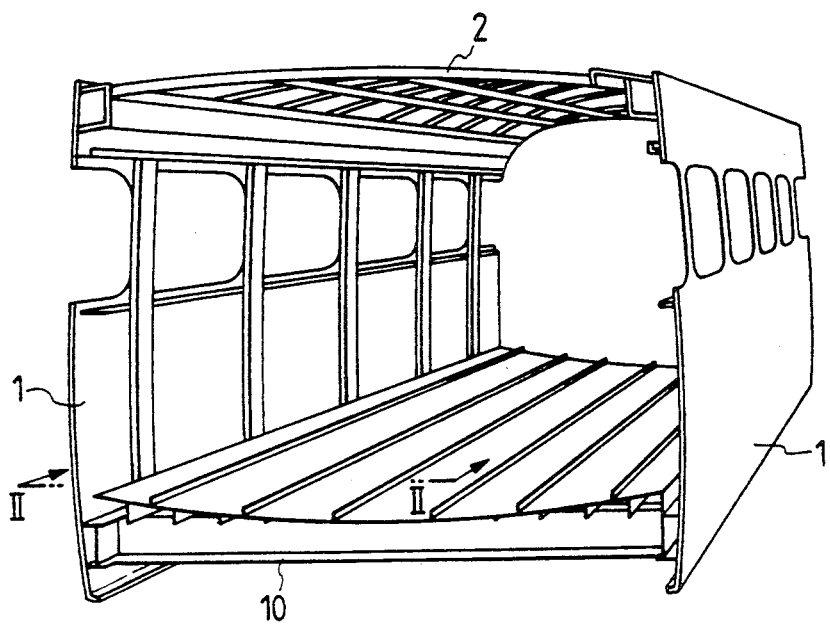
FIG. 1 is a perspective transverse view of a car body for a railway rolling stock constructed in accordance with the present invention.

Referring now to the drawings wherein like reference numerals are used throughout the various views to designate like parts and, more particularly to FIGS. 1-4, according to these FIGS., a car body for a railway rolling stock includes a pair of laterally spaced side constructions 1, forming the respective sides of the car body, a roof construction 2 forming an upper surface of the car body, and an underframe 10 forming a lower surface of the car body.

Figure 2:
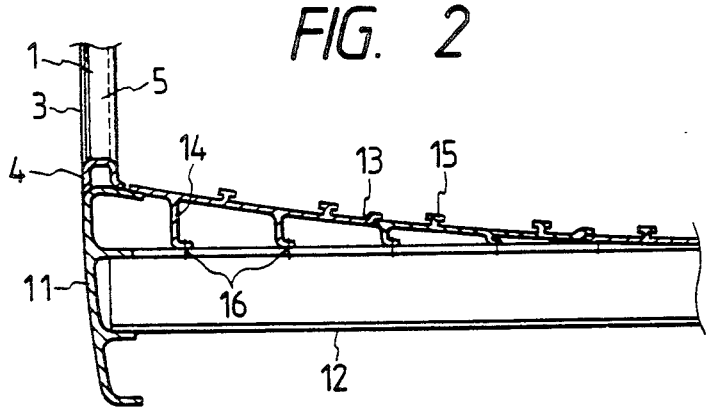
FIG. 2 is a cross-sectional view taken along the line II—II in FIG. 1.

As shown most clearly in FIG. 2, each side construction 1 includes at least one side post 5, a horizontal rib member extending perpendicular to the side post 5 and a side outer plate 3 mounted externally of the side post 5. A rocker rail 4 extends longitudinally of the car body and is mounted on a lower side of the side construction 1. The surface of the side outer plate 3 of the side construction 1 includes an externally convexed curved surface in a vertical direction. The side construction 1 is fashioned so that a rib member extending in a longitudinal direction of the car body and a rib member extending widthwise of the car body are combined and connected, with the outer plate of the roof construction 2 being connected to the outer sides of the rib members. A surface of the outer plate of the roof construction 2 has an externally convexed curved surface in a direction transverse of the car body.

As shown in FIG. 2, the underframe 10 includes side sills 11 disposed on the end along lateral sides of the car body and arranged so as to extend in a longitudinal direction of the car body. The side sills 11 are disposed along respective lateral sides of the car body in parallel with each other. A plurality of cross beams 12 are arranged between and extend perpendicular to the respective side sills 11, with the respective ends of the cross beams 12 being connected to the respective side sills 11. The cross beams 12 are disposed in parallel to each other and are spaced from each other in a longitudinal direction of the car body between the two side sills 11.

Each of the cross beams 12 has a substantially I-shaped cross-sectional configuration with a floor member 13 being mounted on the cross beams 12. The floor member 13 has an upper surface which is curved in a transverse direction of the car body and is preferably formed to have an arcuate surface having at least one radius of curvature. The floor member 13 is preferably constructed of a plurality of extruded shaped members made of a lightweight alloy, with the members extending across the width of the car body and connected to each other, with the connection of the plurality of extruded shape members of the floor member 13 and the respective side sills 11 being carried out by an arc welding process so as to secure the necessary strength and air tightness.

The lightweight metal alloy extruded shape members each include a rib 15 on an upper surface thereof and a supporting portion 14 provided on a lower surface thereof, with the rib 15 and the supporting portion 14 being integrally fashioned with the lightweight alloy extruded shaped members.

As shown in FIG. 2, each of the plurality of supporting portions, as viewed in a width direction of the car body, have a different length or level, with the supporting portion 14 positioned nearest to the center of the underframe 10 being the shortest or having the lowest level. The floor member 13 is mounted on the cross beams 12 so that the upper surface thereof has a curved surface formed by virtue of the supporting portions 14, with the rib 15 being formed so as to prevent a buckling of the floor member 13 and so as to enable or facilitate a mounting of a seat (not shown) provided in a passenger compartment of the car body. The cross beams 12 are connected to the side sills 11 by flanges 11a, 11b, and the floor member 13 is connected to the side sills 11 by a flange 11c. An outer surface of the side sills 11 forms a surface continuous to the surface of the side outer plate 3.

The side construction 1 is constructed by placing and connecting the side posts 5, the rocker rail 4 and the rib member perpendicular to the side posts 5, with the roof construction 2 being constructed by placing and connecting the longitudinal rib member and widthwise rib member of the car body on the outer plate of the roof construction 2.

To construct the underframe 10, the plurality of cross beams 12 are arranged between the two side sills 11 so as to extend perpendicular thereto and are disposed in spaced parallel relationship with respect to each other in a longitudinal direction of the car body, with the cross beams 12 and side sills being connected together. The floor member 13 is connected to the upper surface of the plurality of cross beams at connecting points 16 and to the side sills 11 at the flange 11c. An end construction (not shown) forming the respective ends of the car body in a longitudinal direction of the car is constructed by combining a vertical rib member and a horizontal rib member of the end construction and connecting an outer plate to an outer side of these rib members. The thus separately fabricated side construction 1, roof construction 2, end construction and underframe 10 are combined and connected to thereby form the overall car body. As described above, the floor member 13 is mounted on the underframe 10 when the underframe 10 is fabricated. Then the underframe 10, the respective side constructions 1, and the end construction are connected. Accordingly, the necessary connecting labor of a plurality of light alloy extruded shape members forming the floor member 13 can be carried out on the cross beams 12 to improve the workability. The floor member 13 is small in connected surface because it is mounted on the cross beam 12 through the supporting portions 14 at the connecting points 16; therefore, the mounting of the floor member 13 may be carried out by spot welding instead of continuous welding thereby reducing the manufacturing time and labor involved.

When the railway rolling stock travels within a tunnel at high speeds and when the opposing vehicles pass each other, as noted above, a great variation of external pressure occurs. Additionally, when the railway rolling stock runs into the tunnel at high speeds or exits the tunnel at high speeds a great variation of external pressure also occurs with the variation of external pressure increasing as the overall travel speed of the railway rolling stock increases.

Figure 3:
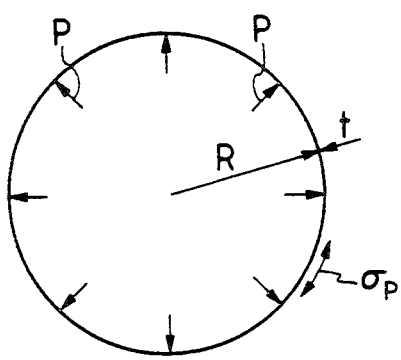
FIG. 3 is a schematic view of a cylindrical vessel illustrating dynamic characteristics of such vessel.

As shown in FIG. 3, when a pressure P acts on a cylindrical vessel, no bending moment occurs on the outer wall of the cylindrical vessel, and the force acting on the outer wall is an in-surface load, i.e., a membrane stress and becomes balanced. The membrane stress $\sigma p$ of a cylindrical vessel may be determined by the following equation:

$$\sigma p = PR/t \tag{1},$$

where:
P = internal pressure applied to the cylindrical vessel,
R = a radius of the cylindrical vessel, and
t = a thickness of an outer wall of the cylindrical vessel.

Figure 4:
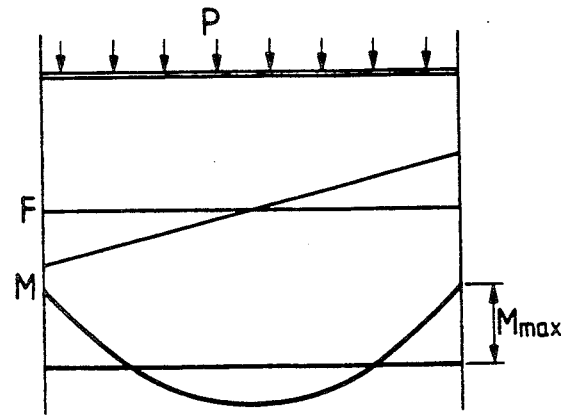
FIG. 4 is a schematic view of a flat plate illustrating dynamic in such plate.
Figure 10:
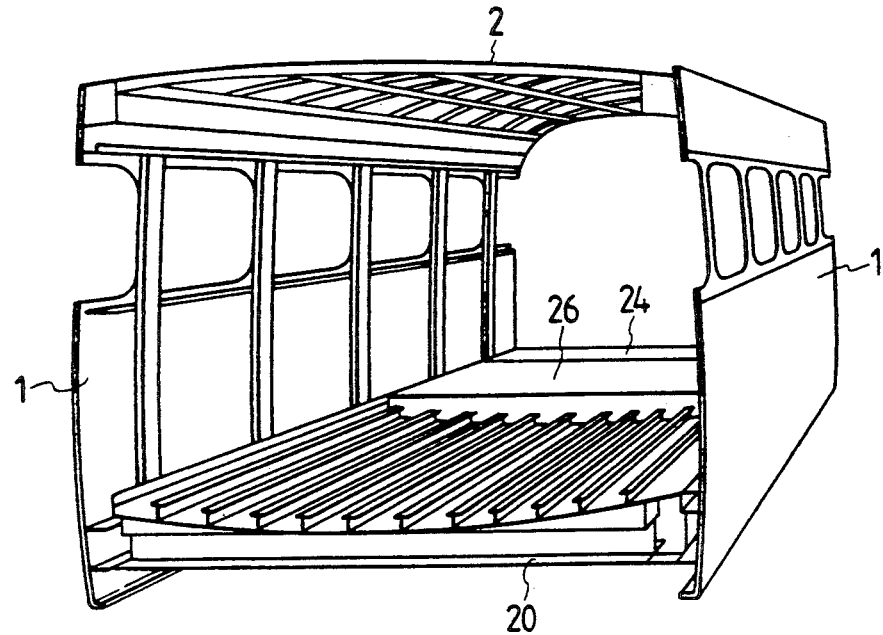
FIG. 10 is a transverse cross-sectional view of a modified car body constructed in accordance with the present invention.
Figure 11:
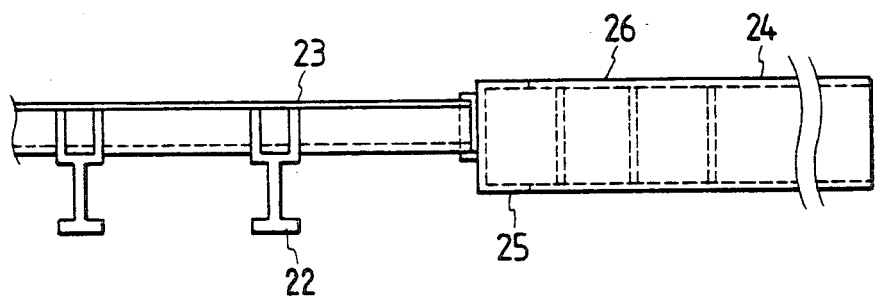
FIG. 11 is a side view of a portion of an underframe of the car body of FIG. 10.

However, when the pressure P acts on a flat plate, as shown in FIG. 4, no membrane stress $\sigma p$ occurs in the flat plate but rather a shear force F and a bending moment M corresponding to the pressure P occurs.

When the pressure P acts on an upper surface of the floor member 13 of the underframe 10 of the present invention and is transmitted to the cross beams 12 through the supporting portions 14 of the floor member 13, the pressure P is mainly borne by the floor member 13 and the cross beams 12. The floor member 13, the upper surface of which is formed into an arcuate curved surface transversely of the car body, bears a portion of the pressure P as a membrane stress within the surface in a manner similar to the outer wall of the cylindrical vessel shown in FIG. 3. Thus, the bending moment acting on the floor member 13 can be reduced.

Since the cross beams 12 and the floor member 13 forming the underframe 10 are connected through the supporting portions 14, the cross beams 12 and floor member 13 behave as one body. Additionally, since the upper surface of the floor member 13 forms an arcuate curved surface extending across a width of the car body, a vertical dimension or spacing between the respective cross beams 12 and the floor member 13 at the respective lateral sides of the car body is greater than a vertical dimension or spacing between the cross beams 12 and the floor member 13 at a central portion of the car body. Consequently, a portion of the underframe 10 nearest the respective side sills 11 has a greater rigidity than that of the central portion widthwise of the car body, with the bending rigidity in the underframe 10 being proportional to a cube of the vertical dimension between the floor member 13 and cross beams 12 of the underframe 10.

The transverse or widthwise distribution of the bending moment acting on the underframe 10 is similar to that of the flat plate shown in FIG. 4. In the construction of the underframe 10, the bending moment increases as it approaches the side sills 11; however, since the underframe 10 has a greater vertical dimension at the respective lateral sides thereof, the bending rigidity is high, and, accordingly, the underframe 10 is advantageously constructed in a manner which enables a bearing of the bending moment. Thus, the bending moment acting on the cross beams 12 of the underframe 10 can be considerably reduced as compared to conventional proposals wherein the upper surface of the upper frame is flat.

Since the underframe 10 itself have a higher bending rigidity toward both lateral sides of the car body, a sufficient rigidity is insured and a cross-sectional shape of the cross beams 12 can be decreased or a thickness of portions of the cross beam 12 can be decreased thereby reducing the weight thereof. Moreover, a vertical dimension of the cross beams 12 can be reduced whereby a vertical dimension of the whole underframe can be reduced. Thus, in applications wherein various equipment is installed on a lower surface of the underframe 10, a sufficient space can be provided for accommodating the equipment. This is particularly advantageous with high speed railway rolling stock requiring instruments or other fairly large equipment to be mounted on a lower surface of the underframe since the size of the underfloor space is increased so as to provide a large accommodating space for enabling an installation of the necessary instruments and large equipment.

By virtue of the capabilities of the underframe 10 to have the sufficient strength with respect to a variation of external pressures due to the circular art-like curved surface of the floor member, and by virtue of the high bending rigidity of the underframe 10 in a cross-sectional shape transversely of the car body, a thickness of the side sills 11, cross beams 12, and floor member 13 forming the underframe 10 can be reduced whereby the entire underframe has an overall reduction in weight.

Since the side construction 1 and roof construction 2 have outer plate portions formed into an outwardly convexed curved surface, the car body has a sufficient strength with respect to any variations of external pressures acting thereon. Moreover, the side construction 1 and the roof construction 2 can be reduced in weight thereby reducing the total weight of the car body while nevertheless providing a car body capable of withstanding variations in external pressures acting thereon.

As shown in FIG. 5, a floor member 13a may be provided having a curved surface across a width of the car body, with the curved surface having a first radius of curvature $R_1$ and a second radius of curvature $R_2$ at respective lateral sides of the floor member 13a, with $R_1 > R_2$. A rocker rail 4A provided at respective lateral sides of the floor member 13a supports the respective lateral ends of the floor member 13a, with the respective lateral ends of the floor member 13a being mounted on an upper surface of the respective rocker rails 4a. The respective lateral ends of the floor member 13a are connected to the upper surface of the respective rocker rails 4a when the underframe and the respective side constructions 1 are combined and connected.

Since the radius of curvature $R_2$ on both lateral ends of the floor member 13a is less than the radius of curvature $R_1$ of the central portion of the floor member 13a, the vertical dimension between the floor member 13a and cross beams 12 at respective lateral sides of the underframe is increased whereby the bending rigidity of the underframe in the transverse and longitudinal direction of the car body can be further improved over that of the embodiment of FIGS. 1-4, while advantageously reducing the weight of the underframe and side constructions 1. However, in all other respects, the embodiment of FIG. 5 has the same effects as described above in connection with the embodiments of FIGS. 1-4.

In FIG. 6, a floor member 13c fashioned of a light-weight alloy extruded shaped member having a hollow portion is provided wherein an upper surface and a lower surface of the floor member 13c are connected by partition walls 14a fixedly arranged in a spaced apart relationship in a transverse direction of the car body.

The floor member 13c is constructed by arranging a plurality of the extruded shape members in a direction of a width of the car body in such a manner that the upper surface of the floor member 13c is spaced from the upper surface of the cross beams 12 at differing vertical dimensions in a transverse direction of the car body, whereby the upper surface of the floor member 13c assumes a circular art-like curved configuration. The cross beams 12a have a shorter height dimension than the cross beams 12 in the embodiment of FIGS. 1-4. Side sills 11' are provided at respective lateral sides of the car body, with the side sills 11' differing from the side sills 11 in the embodiment of FIGS. 1-4 inasmuch as a spacing between the flanges 11a and 11b of the side sill 11' is less than the spacing between the corresponding flanges 11a, 11b of the side sill 11 by virtue of the reduced height of the cross beams 12a.

By virtue of the fact that the floor member 13c is formed from extruded shaped members made of a lightweight alloy having hollow portions partitioned by the partition walls 14, the rigidity of the floor member 13c is higher than that of the floor member 13. Additionally, the floor member 13c with the reduced height cross beam 12a results in providing a larger space beneath the underframe for accommodating the necessary equipment and instruments for the railway rolling stock. Moreover, the hollow portions of the floor member 13c, by virtue of the reduced cross sectional area, can be utilized as air conditioning ducts to be connected to an air conditioning unit or ducts for accommodating wires or various pipes. In all other respects, the embodiment of FIG. 6 has similar effects to the previously described embodiments.

In FIG. 7, a floor member 13d is composed of a plurality of lightweight alloy extruded shaped members having upper and lower surfaces connected by spaced partitioned walls 14b so as to form a plurality of hollow portions. Floor member 13 is constructed by arranging a plurality of the extruded shaped members along a width of the car body, with the extruded shaped members having differing vertical dimensions whereby the upper surface of the floor member 13d assumes a circular or arch-shaped configuration, with the lower surface of the floor member 13b being substantially planar or flat. The extruded shaped members forming the floor member 13d have an improved strength by increasing a thickness of the various parts. Sills 11" are disposed on respective lateral sides of the car body, with the respective ends of the floor member 13d being mounted on flanges 11a, 11c of the sills 11". The underframe of the embodiment of FIG. 7 is constructed such that the two side sills 11" are arranged in parallel to each other in a fixed spaced relationship with the floor member 13d being arranged therebetween. In the embodiment of FIG. 7 no cross beams such as the cross beams 12 or 12a of the previously described embodiments are provided.

As readily apparent, with an underframe constructed in the manner illustrated in FIG. 7, wherein the floor member 13d is arranged between the two spaced side sills 11" with no cross beam, the space beneath the underframe in which necessary instruments and the equipment necessary for operation of the railway rolling stock can be increased. Moreover, by virtue of the elimination of the cross beams, the number of elements forming the entire underframe can be reduced thereby reducing the labor and time necessary for fabricating the underframe. In all other respects, the underframe of FIG. 7 is similar to the above-described embodiments.

As shown in FIG. 8, a floor member 13e is provided which is composed of a plurality of light alloy extruded shaped members in which a portion constituting a curved surface and a rib 15 are integrally formed, with the floor member 13e being constructed by arranging a plurality of the extruded shaped members across a width of the car body and connecting the respective members to each other. The upper surface of the floor member 13e is formed into a circular art-like curved surface, with a supporting member 17 being provided for supporting the floor member 13e on the cross beams 12. The supporting member 17 includes a floor member supporting surface formed into a curved surface coincident with the curved surface of the floor member 13e. The cross sectional shape of the supporting member 17 is substantially L-shaped, with the narrowest distance between the cross beams 12 and the curved surface of the floor member 13e being disposed in a central portion of the car body.

To fabricate the underframe illustrated in FIG. 8, the side sills 11 are arranged in parallel to each other at opposite lateral sides of the car body and the cross beams 12 are arranged between the side sills 11 and connected thereto. The supporting member 17 is then mounted on the cross beams 12, and the floor member 13e is mounted on the supporting surface of the supporting member 17. After the underframe is constructed in this manner, the underframe is then connected to the side constructions 1 and the respective end constructions (not shown).

By constructing the floor member 13e by arranging a plurality of extruded shaped members having the same sectional shape along a width of the car body, the plurality of extruded shaped members forming the floor member have the same sectional shape and, therefore, the extruded shapes themselves can be reduced in cost. That is, in fabricating a plurality of different types of extruded shapes, a plurality of molds for fabricating each of the extruded shapes are required and the molds for fabricating the extruded shapes are extremely expensive. Thus, where the floor member is constructed by extruded shapes having a plurality of sectional shapes, the cost of each of the shapes increases. By unifying the plurality of extruded shapes, the cost of the extruded shapes can be reduced. In all other respects, the embodiment of FIG. 8 is similar to the embodiment described in connection with FIGS. 1-4.

As shown in FIG. 9, a floor member 13f, similar to that of the embodiment in FIG. 8, is provided but the floor member 13f has fewer ribs 15. A supporting member 18 is provided and extends between the side sills 11 disposed at respective lateral sides of the car body with the supporting member 18 supporting the floor member 13f on the cross beams 12. The supporting member 18 is fabricated by a plastic deformation process so that an upper surface thereof has the same radius of curvature as the curved surface of the floor member 13f, with the cross sectional shape of the supporting member being an inverted substantially L-shape. Accordingly, the supporting surface of the supporting member 18 for supporting the floor member 13f has a width dimension to some extent, and since the floor member 13f extends in a longitudinal direction of the car body, the fabrication work and transportation work can be cumbersome. In view of this fact, the floor member 13f may be divided into a plurality of sections in a longitudinal direction of the car body and may be connected by the supporting surface of the supporting member 18.

After the two side sills 11 and plurality of cross beams 12 have been connected, a plurality of the supporting members 18 are mounted between the side sills 11 and the floor member 13f is mounted on the supporting member 18. By virtue of this alternative fabrication method, after the supporting member 18 has been mounted on the lower surface of the floor member 13f, the floor member 13f and the supporting member 18 may then be mounted between the two side sills 11.

Since the supporting member 18 is arranged so as to extend in a direction across the width of the car body, a number of supporting members 18 can be reduced to about one-half of the number of supporting members 17 necessary in the embodiment of FIG. 8.

With the floor member 13f divided into a plurality of sections in a longitudinal direction of the car body and supported by the supporting surface of the supporting member 18, the fabrication process and transportation steps of the floor member 13f are greatly facilitated. In all other respects, the embodiment of FIG. 9 is similar to the embodiment described hereinabove in connection with FIGS. 1-4.

FIGS. 10-15 illustrate a further embodiment of the present invention wherein the side construction 1 and roof construction 2 have the same construction as the embodiment of FIGS. 1-4; however, an underframe 20 is provided which differs in construction from each of the above-described embodiments. More particularly, the underframe 20 includes two side sills 21 arranged on respective lateral sides of the car body and extending in a longitudinal direction of the car body, with a plurality of cross beams 22 being disposed between the two side sills 21, a floor member 23 being installed above the cross beams 22, and an end underframe 24 being installed at a position at respective longitudinal ends of the underframe 20 for accommodating trucks (not shown).

The side sills 21 are formed along inner surfaces thereof with a plurality of flanges 21a, 21b, 21c to which the respective lateral ends of the cross beams 22 and ends of the floor member 23 are connected. The cross beams 22 are arranged between the side sills 21 in parallel to each other and spaced in a longitudinal direction of the car body with the respective lateral ends of the cross beams 22 being connected to the flange 21c of the side sills 21.

Figures 12, 13:
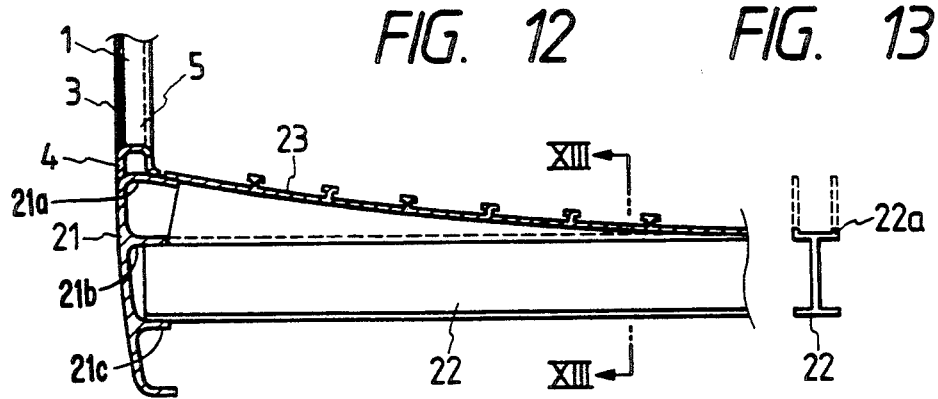
FIG. 12 is a transverse cross-sectional view of a portion of the underframe of the car body of FIG. 10 with a floor member installed thereon.
FIG. 13 is a cross-sectional view taken along the line XIII—XIII of a cross beam in FIG. 12.
Figure 14:
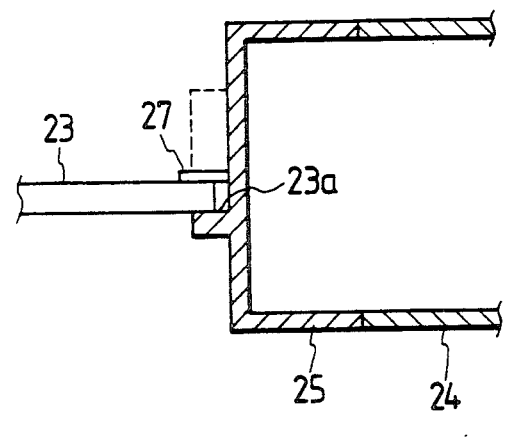
FIG. 14 is a cross-sectional view of a floor member supporting a portion of an end underframe of the car body of FIG. 10.
Figure 15:
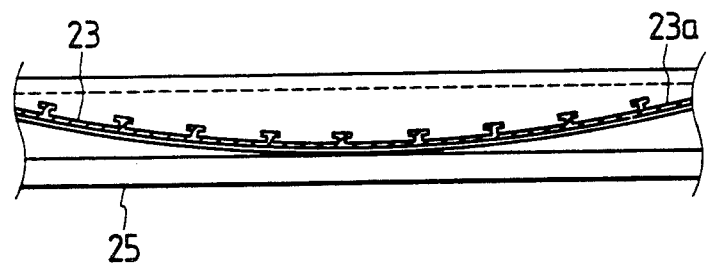
FIG. 15 is a front view of the floor member supporting portion of the end underframe of FIG. 14.

As shown most clearly in FIG. 13, an upper portion of the cross beams 22 has a substantially Y-shape for forming a floor member supporting portion 22a, with the floor member supporting portion 22a being formed so that the upper surface thereof has a radius of curvature corresponding to the curved surface of the floor member 23. A cross beam 22 is advantageously constructed by extruding a light weight alloy, with the curved surface of the floor member supporting portion 22a being constructed by cutting the extruded shapes. The longitudinal ends of the body of the floor member 23 is cut corresponding to the flange 21b on the side sill 21.

The floor member 23 is constructed by connecting a plurality of extruded shaped members of a lightweight alloy material in a manner similar to that described hereinabove in connection with the embodiments of FIGS. 8 and 9. The end-frame 24 is constituted by an end-underframe cross beam 25 and a bolster body 26 arranged between the side sills 21, with the cross beam 25 and the body bolster 26 being connected to the respective side sills 21. The cross beam 25 is arranged at one end of the end-underframe 24 nearer a center of the car body than the other end thereof, as viewed in a longitudinal direction of the car body. The cross beam 25 is formed from extruded shaped members made of a lightweight alloy and includes an upper flange, a lower flange, and a web connecting the upper and lower flanges, with the web having a substantial thickness. By cutting and removing a portion of the web, as shown in dotted line in FIG. 14, a floor member supporting portion 23a for supporting an end of the floor member 23, in a longitudinal direction of the car body, is formed, with the floor member supporting portion 23a having a curved surface with a radius of curvature coincidental with the curved surface of the floor member 23. A fixing of fastening member is provided for maintaining the end of the floor member 23 in a longitudinal direction of the car body.

The two side sills are arranged in parallel to each other and in a fixed spaced relationship at opposite lateral sides of the car body, with the plurality of cross beams 22, two cross beams near the bolster 25, and plurality of body bolsters 26 being arranged and connected to the side sills 21. The plurality of cross beams 22 are preformed or prefabricated with the floor member supporting portions 22a, and the floor member 23 is mounted above the plurality of cross beams 22. At this time, the end of the floor member 23, as viewed in a longitudinal direction of the car body, is placed on the floor member supporting portion 23a of the cross beam near the bolster 25 and the contact portion is joined by welding, and the body bolster 26 constitutes a portion for transmitting a vertical load of the car body to the associated truck.

In the underframe construction of FIGS. 11-15, the body end load, that is the tractive force or braking force transmitted from a connector provided on the end of the car body, as viewed in a longitudinal direction thereof, is received by the body bolster 26, with the end load being transmitted from the body bolster 26 to the opposite beam at the other longitudinal end of the car body through the side sills 21 and the floor member 23. The opposite beam transmits the car body end load to the other car body through a separate connector. Since the floor member 23 has a curved surface in a transverse or width direction of the car body, it has a sufficient strength with respect to a tension load and compression load in a longitudinal direction of the car body and, accordingly, a part of the car body end load can satisfactorily be carried. A part of the body end load is carried by the floor member 23 whereby the body end load carried by the side sills 21 is reduced and, consequently, the side sills 21 can have a reduced thickness and weight.

Since the side sills 21 of the embodiment of FIGS. 10-15 is formed in an upper portion thereof with a floor member supporting portion 22a by cutting, a separate supporting member for supporting the floor member 23 is not required. Consequently, the number of necessary members of parts forming the underframe 20 can be reduced thereby reducing the time and labor required for fabricating the underframe 20. Moreover, since the supporting portion 23a for supporting the floor member 23 is formed integrally with the cross beam 25, any necessary connecting steps between the cross beam bolster 25 and the floor member 23 can be easily accomplished, and by joining the cross beam near the bolster 25 with the floor member 23 by a welding joint, a sufficient air tightness can be insured and the car body end load can be transmitted through the weld joint. In all other respects, the embodiments of FIGS. 10-15 is similar to that of the embodiment of FIGS. 1-4, FIG. 8, and FIG. 9.

By virtue of the above-noted features of the present invention, an underframe is provided which is formed with a curved surface having at least one or more radius of curvatures extending along a transverse or width direction of the car body, whereby the car body of a railway rolling stock can be provided which is light in weight while nevertheless being capable of withstanding a variation of external pressures. Moreover, by virtue of the fact that the floor member, the cross beam, or the end underframe cross beam are formed as extruded shaped members, the total number of members can be reduced thereby facilitating fabrication of the underframe or the entire car body.

Moreover, by virtue of the features of the present invention, the strength of the entire underframe can be significantly improved by the floor member provided on the underframe since the compression load on the end of the body is borne by the floor member thereby advantageously reducing the weight of the underframe.

While we have shown and described several embodiments in accordance with the present invention, it is understood that the same is not limited thereto but is acceptable to numerous changes and modifications as known to one of ordinary skill in the art, and we therefore do not wish to be limited to the details shown and described herein, but intend to cover all such modifications as are encompassed by the scope of the appended claims.

We claim:

1. A substantially air-tight railway passenger car including a car body comprising an underframe means, a pair of side means disposed on respective lateral sides of said underframe means for forming sides of the car body, means for defining respective longitudinal ends of the car body, and a roof means for forming a roof of the car body, wherein said underframe means comprises a floor means including a curved surface of at least one radius of curvature with respect to a transverse direction of the car body, and wherein said floor means is fashioned of an extruded light alloy material and includes reinforcing means extending in a thickness direction of the floor means and continuously in a longitudinal direction of the car body.

2. A railway passenger car according to claim 1, wherein said underframe means comprises side sill means respectively disposed along lateral sides of the car body and arranged so as to extend in a longitudinal direction of the car body, and said floor means is arranged between said side sill means and extends in the longitudinal direction of the car body.

3. A railway passenger car according to claim 2, wherein said floor means comprises a plurality of lightweight alloy shaped members disposed and aligned in a transverse direction of the car body, and joined to each other.

4. A railway passenger car according to claim 1, wherein said underframe means comprises a pair of side sill means respectively disposed along lateral sides of the car body and arranged so as to extend in a longitudinal direction of the car body, a plurality of cross beam means disposed between said sill means so as to extend in a transverse direction of the car body and mounted on said side sill means at respective ends of said cross beam means, and wherein the floor means is disposed on an upper surface of said cross beam means.

5. A railway passenger car according to claim 4, wherein said floor means comprises a plurality of lightweight alloy extruded shaped members disposed in alignment in a transverse direction of the car body and joined to each other.

6. A railway passenger car according to claim 5, wherein each of said extruded shaped members includes an integrally formed rib along a surface thereof forming said reinforcing means, said rib projecting in the thickness direction of said floor means and continuously extending in the longitudinal direction of the car body.

7. A railway passenger car according to claim 5, wherein each of said extruded shaped members include an integrally formed supporting portion adapted to be connected to said cross beam means.

8. A passenger railway car according to claim 4, further comprising a supporting means for enabling an installation of said floor means on said cross beam means whereby said floor means is supported on said cross beam means.

9. A railway passenger car according to claim 8, wherein a supporting surface of said supporting means comprises a curved surface having a radius of curvature extending along the width of the car body corresponding to the radius of curvature of said curved surface of said floor means.

10. A railway passenger car according to claim 4, wherein each of said cross beam means includes supporting surface means for supporting said floor means, and wherein said supporting surface means comprises a curved surface corresponding with the radius of curvature of said curved surface of said floor means.

11. A car body of a railway rolling stock comprising an underframe means, a pair of side means disposed on respective lateral sides of said underframe means for forming sides of the car body, and roof means for forming a roof of the car body, said underframe means comprises a pair of side sill means respectively disposed along lateral sided of the car body and arranged so as to extend in a longitudinal direction of the car body, cross beam means arranged between said side sill means and having lateral ends respectively mounted on said side sill means, and a floor means disposed on an upper surface of said cross beam means and comprising a curved surface having at least one radius of curvature extending across a width of the car body, and wherein said cross beam means comprises a plurality of lightweight alloy extruded members having a substantially Y-shaped portion, and a surface means for supporting said floor means comprising a curved surface corresponding with the radius of curvature of said curved surface of said floor means.

12. A railway passenger car according to claim 4, wherein each of said side sill means includes a web surface continuous with an outer plate surface of said side means.

13. A car body for a railway rolling stock comprising an underframe means, a pair of side means disposed on respective lateral sides of said underframe means for forming sides of the car body, and roof means for forming a roof of the car body, said underframe means comprises a pair of side sill means respectively disposed along lateral sides of the car body and arranged so as to extend in a longitudinal direction of the car body, cross beam means arranged between said side sill means and having lateral ends respectively mounted on said side sill means, and a floor means disposed on an upper surface of said cross beam means and comprising a curved surface having at least one radius of curvature extending across a width of the car body, and wherein each of said side means includes an inner surface having at least one flange means for enabling a connection of said cross beam means and at least one further flange means connected to a lateral end of said floor means.

14. A car body for a railway rolling stock comprising an underframe means, a pair of side means disposed on respective lateral sides of said underframe means for forming sides of the ca body, and roof means for forming a roof of the car body, said underframe means comprises a pair of side sill means respectively disposed along lateral sides of the car body and arranged so as to extend in a longitudinal direction of the cart body, cross beam means arranged between said side sill means and having lateral ends respectively mounted on said side sill means, and a floor means disposed on an upper surface of said cross beam means and comprising a curved surface having at least one radius of curvature extending across a width of the car body, and wherein respective lateral ends of said floor means are respectively connected to a rocker rail means of the side means.

15. A railway passenger car according to claim 1, wherein said underframe means comprises a pair of side sill means respectively disposed along lateral sides of the car body and arranged so as to extend in a longitudinal direction of the car body, a plurality of cross beam means disposed between said side sill means so as to extend in a transverse direction of the car body and mounted at respective lateral ends thereof on said side sill means, said floor means being disposed on an upper surface of said cross beam means, and end underframe means comprising a body bolster means disposed at positions of the underframe means where railway truck means are provided, and an end-underframe cross beam means disposed between said side sill means and extending in a transverse direction of the car body.

16. A railway passenger car according to claim 15, wherein said end-underframe cross beam means is located at one end of said end-underframe means nearer a center of the car body in a longitudinal direction of the car body than the other end of said end-underframe means and is formed of a light weight ally extruded material, and wherein said end-frame cross beam means has a thick web means formed with a circular arc-like supporting surface extending across a width of the car body for supporting said floor means.

17. A substantially air-tight railway passenger car underframe means for forming a lower surface of the passenger car, said underframe means including a pair of side sill means respectively disposed along lateral sides of the car and extending in a longitudinal direction of the car, wherein said underframe means comprises a floor means of a lightweight ally extruded material with at least an upper cured surface in at least one radius of curvature extending a cross a width of the car, and wherein reinforcing means are integrally formed in one piece with the floor means and project in a thickness direction of said floor means for reinforcing said floor means.

18. A substantially air-tight railway passenger car underframe means for forming a lower surface of the passenger car, the underframe means comprising side sill means respectively disposed along lateral sides of the car and extending in a longitudinal direction of the car, a plurality of cross beam means disposed in a transverse direction of the car side sill means to extend in a transverse direction of the car and mounted at respective lateral ends thereof on said side sill means, said underframe means comprising a floor means formed of a lightweight alloy extruded material disposed on an upper surface of said cross beam means, said floor means including a curved surface having at least one radius of curvature with respect to a transverse direction of the car, said floor means including a reinforcing means integrally formed in one piece with the floor means and projecting in a direction of a thickness of said floor means.

19. An underframe means of a railway rolling stock for forming a lower surface of a car body and comprising side sill means respectively disposed along lateral sides of the car body and extending in a longitudinal direction of the car body, cross beam means disposed in a transverse direction of the car body between said side sill means and connected at respective lateral ends thereof with said side sill means, said underframe means comprising a floor means formed of extruded shaped members and disposed on an upper surface of said cross beam means, said floor means including a curved surface having at least one radius of curvature extending across a width of the car body, and wherein said cross beam means if formed of extruded shaped members made of a lightweight alloy having a substantially U-shaped section and an upper portion formed into a circular arc-like configuration corresponding to the at least one radius of curvature of the curved surface of said floor means.

20. A substantially air-tight railway passenger car underframe means for forming a lower surface of the passenger car, the underframe means comprising a pair of side sill means respectively disposed along lateral sided of the car and arranged so as to extend in a longitudinal direction of the car, a plurality of cross beam means disposed between said side sill means to extend in a transverse direction of the car and mounted on respective lateral ends to said side sill means, and an end underframe means comprising body bolster means at positions of the car at which railway truck means are provided, said end-underframe means provided at respective longitudinal ends of the car, said end-underframe means including end-underframe cross beam means disposed adjacent said body bolster means and between said side sill means to extend in the transverse direction of the car and wherein a floor means is provided having a curved surface with at least one radius of curvature with respect to the transverse direction of the car, said floor means is disposed on an upper surface of said cross beam means and is positioned in an area enclosed by said side sill means and the respective end-underframe means, said floor means being formed of a lightweight alloy extruded material and including a reinforcing means integrally formed in one piece with the floor means and projecting in a direction of a thickness of said floor means.

21. A substantially air-tight railway passenger car underframe means to claim 20, wherein the end-underframe cross beam means is located at one end of said end-underframe means nearer a center of the car in a longitudinal direction of the car than the other end of said end-underframe means, said end-underframe means is formed of a lightweight alloy extruded material and includes a thick web in which a supporting surface for supporting said floor means is formed, said supporting surface being curved in a radius of curvature corresponding with the radius of curvature of the curved surface of said floor means.

22. A method of fabricating a substantially air-tight passenger railway car including a car body, with the car body comprising a roof means for forming a roof of the car body, side means for forming respective lateral sides of the car body, end means for forming respective longitudinal ends of the car body, and underframe means all of which are separately constructed and combined to form the car body, the method comprising the steps of installing a floor member having a curved surface of at least one radius of curvature with respect to a transverse direction of the car body and formed of a lightweight alloy extruded material having a reinforcing means integrally formed in one piece with the floor means and extending in a thickness direction of the floor means on an upper surface of said underframe means, and joining said underframe means, said roof means, said side means, and said end frame means so as to form the car body.

* * * * *